United States Patent [19]

Burgdorf et al.

[11] Patent Number: 4,790,608
[45] Date of Patent: Dec. 13, 1988

[54] SKID-CONTROLLED BRAKE SYSTEM WITH MASTER CYLINDER PISTONS AND WITH PLUNGERS SUPPORTED ON STATIONARY TRANSVERSE MEMBER

[75] Inventors: Jochen Burgdorf, Offenbach-Rumpenheim; Hans-Dieter Reinartz, Frankfurt am Main, both of Fed. Rep. of Germany

[73] Assignee: Alfred Teves GmbH, Frankfurt am Main, Fed. Rep. of Germany

[21] Appl. No.: 78,233

[22] Filed: Jul. 27, 1987

[30] Foreign Application Priority Data

Aug. 8, 1986 [DE] Fed. Rep. of Germany ....... 3627000

[51] Int. Cl.$^4$ ........................... B60T 8/32; B60T 8/48; B60T 8/44; B60T 13/14
[52] U.S. Cl. ...................................... 303/114; 60/581; 188/345; 303/52; 303/116; 303/119
[58] Field of Search ............... 303/114, 119, 116, 113, 303/68-69, 10-12, 50-56; 188/181, 345; 60/547.1, 581, 591, 582, 545

[56] References Cited

U.S. PATENT DOCUMENTS

| | | | |
|---|---|---|---|
| 4,477,125 | 10/1984 | Belart et al. | 303/114 X |
| 4,492,413 | 1/1985 | Belart et al. | 303/114 X |
| 4,578,951 | 4/1986 | Belart et al. | 303/114 X |
| 4,685,747 | 8/1987 | Belart et al. | 303/114 |
| 4,687,259 | 8/1987 | Reinartz et al. | 303/52 X |
| 4,708,404 | 11/1987 | Seibert et al. | 303/116 X |

FOREIGN PATENT DOCUMENTS

| | | |
|---|---|---|
| 0181156 | 5/1986 | European Pat. Off. . |
| 3040548 | 5/1982 | Fed. Rep. of Germany . |
| 3247497 | 6/1984 | Fed. Rep. of Germany . |
| 3338322 | 5/1985 | Fed. Rep. of Germany . |
| 3502018 | 7/1986 | Fed. Rep. of Germany . |
| 3505410 | 8/1986 | Fed. Rep. of Germany . |
| 2086506 | 5/1982 | United Kingdom . |
| 2132718 | 7/1984 | United Kingdom . |
| 2170286 | 7/1986 | United Kingdom . |
| 2173559 | 10/1986 | United Kingdom ................ 303/116 |

Primary Examiner—Douglas C. Butler
Attorney, Agent, or Firm—James B. Raden

[57] ABSTRACT

In a skid-controlled brake system including a diagonal division of the brake circuits (I and II), the wheel brakes (31 to 34), through main brake lines (62, 63) and branch lines (47 to 50), are in communication with the master cylinder (2) of the brake pressure generator (1), with inlet valves (24, 25 and 29, 30, respectively), open in de-energized position, being provided in the branch lines. Moreover, in-flow lines (45, 46) provided with check valves (38, 39) are couupled to the main brake lines (62, 63), through which, in the event of a locking tendency of the vehicle wheels, pressure fluid is delivered by two hydropumps (21, 26) into the brake circuits (I, II) causing the pistons (6, 7) of the master cylinder (2) to be restored against the pedal force (F) and the central control valves (10, 11) located in pistons (6, 7) to be opened thereby enabling pressure fluid to flow off into the tank (20). The wheel brakes (31 to 34), through outlet valves (22, 23 and 35, 36, respectively), closed in de-energized condition, are in communication with a return line (37) also connected to which is the intake line (61) of the two pumps (21, 26).

4 Claims, 2 Drawing Sheets

SKID-CONTROLLED BRAKE SYSTEM WITH MASTER CYLINDER PISTONS AND WITH PLUNGERS SUPPORTED ON STATIONARY TRANSVERSE MEMBER

BACKGROUND OF THE INVENTION

The present invention is concerned with a skid-controlled brake system comprising a pedal-operated, preferably auxiliary-force-supported, brake pressure generator including a master cylinder connected to wheel brakes through main brake lines; a hydraulic auxiliary pressure supply system and wheel sensors as well as electronic circuits for detecting the wheel rotation pattern and for generating electric brake pressure control signals to control electromagnetically operable pressure fluid inlet valves and outlet valves provided in the pressure fluid conduits for skid control.

In some brake systems of the afore-described type (see U.S. Pat. Nos. 4,415,210 and 4,416,491), the brake pressure generator is a master cylinder coupled to a hydraulic brake force booster. The auxiliary pressure supply system includes a hydraulic pump and a hydraulic accumulator which, when the brake is applied, provides with the aid of a control valve, an auxiliary pressure in proportion to the pedal force. The dynamic pressure, through the master cylinder, is transmitted to the static brake circuits in communication with the master cylinder. The wheel brakes of one axle, preferably of the rear axle, are in direct communication with the pressure chamber and receive through the control valve, the pressure proportional to the pedal force. Moreover, for slip control, inlet valves are provided both in the static circuits and in the dynamic circuit, which inlet valves, normally, are switched to the passage position and by way of which, in the event of imminent locking of a wheel, the pressure fluid flow to the wheel brake concerned is discontinued.

Outlet valves are provided through which, if need be, pressure fluid flowing to the wheel brake can be directed toward the pressure compensating tank. Upon commencement of the skid control, through a so-called main valve, the booster chamber in which the controlled pressure admitted from the auxiliary pressure supply system prevails, communicates with the static brake circuits of the master cylinder to enable the amount of pressure fluid discharged through the outlet valves to be re-introduced to the static circuits. Moreover, for safety reasons, the piston in the master cylinder (or pistons if it is a tandem master cylinder) are restored or locked with the aid of a positioning means. Considerable structure is involved with generating, storing and controlling the hydraulic auxiliary pressure, with the dynamic in-flow into the static circuits and with insuring the proper operation of the brake upon failure of individual circuits.

The control signals for the inlet and outlet valves in brake systems of this type are generated with the aid of electronic switch circuits. The inputs these circuits are in communication with wheel sensors, e.g. inductive transducers, so that the circuits can respond to any change in the wheel rotation pattern indicating a locking risk. The responses can operate to keep constant, lowering or increase the pressure on the corresponding wheel.

SUMMARY OF THE INVENTION

It is the object of the present invention to configure a brake system of the type described above so that pressure fluid flows through as few valves as possible when applying the brake normally and also in the event of brake pressure control. Moreover, after each skid control, the master cylinder position is completely restored to insure a maximum reserve for deceleration in the event of a failure of the pump. Finally, the brake system provides a simple anti-locking system with a diagonal division of the brake circuit.

In accordance with this invention, the pistons of the master cylinder are provided with central control valves which, in the brake releasing position, open pressure fluid conduits between the pressure fluid reservoir and the pressure chambers and, in the braking position, close the said pressure fluid conduits. The main brake lines, through in-flow lines containing check valves, are in communication with the pumps driven by motive force. The suction connections of the pump through an intake line, are in communication with the return line or the intake reservoir.

BRIEF DESCRIPTION OF THE DRAWING

Further features, advantages and applications of the invention will be understood from the following description of one taken with the figures of the accompanying drawing, in which.

DETAILED DESCRIPTION OF A PREFERRED EMBODIMENT

Figure 1:
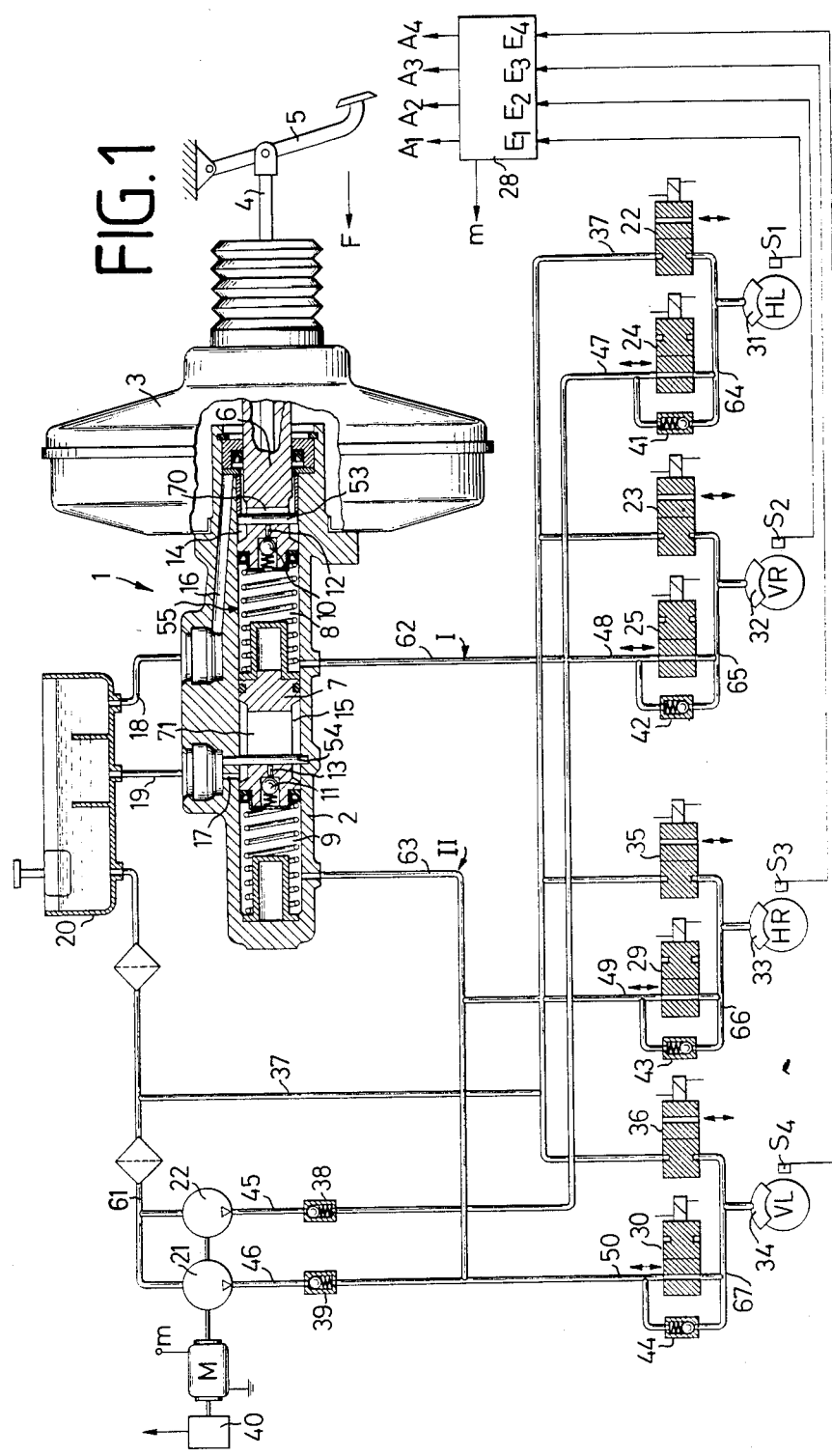
FIG. 1 is a schematic, partly sectional illustration of a skid controlled brake system in accordance with this invention.

The brake system shown in FIG. 1, includes a hydraulic aggregate substantially comprising a tandem master cylinder 2 and a vacuum booster 2 coupled ahead thereof to form the brake pressure generator 1. The pedal force F exerted on a brake pedal 5, through a push rod 4, is transmitted, in known manner, to the vacuum booster 3 from where it is transferred, supported by auxiliary force, to the working pistons 6 and 7 of the tandem master cylinder 2.

In the release position of the brake shown in the drawing, the pressure chambers 8, 9 of the master cylinder 2, through open central control valves 10, 11 through connecting channels 12, 13 in the interior of the pistons 6, 7 and, through annular chambers 14, 15, connecting ports 16, 17 and hydraulic lines 18, 19 are in communication with a pressure compensating and pressure fluid reservoir 20.

Two brake circuits I, II are connected to the master cylinder 2, and to the wheel brakes 31, 32; 33, 34. The brake circuits I and II include electromagnetically operable valves which in the release position are open so that these valves 24, 25 and 29, 30 are inlet valves providing for communication between the master cylinder and the wheel brakes 31, 32; 33, 34. The wheel brakes 31, 32 and 33, 34, respectively, connected in parallel, are associated with the diagonals.

The wheel brakes 31, 32, 33, 34 are also connected to electromagnetically operable outlet valves 22, 23 and 35, 36, respectively (so-called SG-valves). These outlet valves 22, 23, 35 and 36 are closed in the basic position and thus block fluid flow. The outlet valves 22, 23, 35 and 36 communicate through a hydraulic return conduit 37, with the pressure compensating reservoir 20 and also through intake line 61, with the intake sides of hydraulic pumps 21, 26 driven by electromotive force (motor M). The electrical connections "m" and "ground", are shown in the drawing. Moreover, an electrically operated functional mechanism or monitoring circuit 40 is provided which is operative to check the proper operation of motor M.

The vehicle wheels are furnished with inductive sensors $S_1$ to $S_4$ cooperating with a toothed disk engaged in synchronism with the revolution of the wheel to generate electric signals identifying the wheel rotation pattern, i.e. the wheel speed and changes. These signals, are fed to the inputs $E_1$ to $E_4$ of an electronic signal processing and logic circuit 28 which generates brake pressure control signals upon identification of a locking tendency. The brake pressure control signals temporarily switch the inlet and outlet valves 22, 23, 24, 25, 29, 30, 35, 36 to keep the brake pressure constant, decrease it and, optionally, re-raise it. The brake pressure control signals are fed through outputs $A_1$ to $A_4$, and drive the actuating magnets of the inlet and outlet valves. The electrical connecting lines between outputs $A_1$ to $A_4$ and the windings of valves 22, 23, 24, 25, 29, 30, 35, 36 are not shown for the sake of simplicity. Circuit 28, in known manner, can be realized by hardware-implemented circuits or by programmable electronic modules, such as microcomputers or microcontrollers. The switch-on signal for starting the driving motor M of the hydraulic pumps 21, 26 is fed through output m so that the pumps are in operation during a slip control.

The operation of the brake system follows.

Upon applying the brake, the pedal force F—supported by the vacuum pressure in the booster 3—is transmitted to the master cylinder piston 6, 7. The central control valves 10, 11 will close to enable brake pressure to now build up in the brake chambers 8, 9 and, hence in the brake circuits I, II which, through valves 24, 25 and 29, 30, respectively, is fed to the wheel brakes 31, 32 and 33, 34, respectively.

If a locking tendency on one or more wheels is detected by the sensors $S_1$ to $S_4$ and circuit 28, skid control will commence. Driving motor M of pumps 21, 26 will start, with pressure developing in the two in-flow lines 45, 46 which acts on the wheel brakes 31 to 34 through check valves 38, 39 and branch lines 47, 48 and 49, 50, respectively, and through inlet valves 25, 26 and 29, 30. This pressure also acts on the pressure chambers 8, 9 of the master cylinder 2.

An output signal of the circuit 28 results in the switch of the electromagnetically operable inlet valves 24, 25 and 29, 30, respectively, to their closed positions and, thus, blocks the brakes circuits I, II and the branch lines 47 to 50, respectively. A further displacement of the master cylinder pistons 6, 7 toward the pedal force F, and an evacuation of the pressure chambers 8, 9 will be precluded because the pressure fluid flows from the pumps 21, 26 through the supply lines 45, 46, the opened check valves 38, 39 and the master brake lines 62, 63 into the pressure chambers 8, 9 to restore the pistons 6, 7 to their initial position. The actual brake pressure pattern in the wheel brakes 31 to 34 is determined by the inlet and outlet valves 22, 23, 24, 25, 29, 30, 35, 36 to which further skid controlling brake pressure control signals are fed through lines $A_1$ to $A_4$.

As shown in the drawing, the inlet valves 24, 25 and 29, 30, respectively, in addition, are locked by parallel-connected check valves 41, 42 and 43, 44, respectively. The check valves 41, 42, in special cases, permit a termination of the brake pressure control and a release of the wheel brakes, respectively, because, with inlet valves 24, 25 and 29, 30, respectively, and outlet valves 22, 23 and 35, 36, respectively, still closed, a small amount of fluid pressure can flow back from the wheel brakes 31 to 34 to the pressure chambers 8, 9 if the pistons 6, 7 of the master cylinder 2 are restored to the initial position and the central control valves 10, 11 are in the open position.

Figure 2:
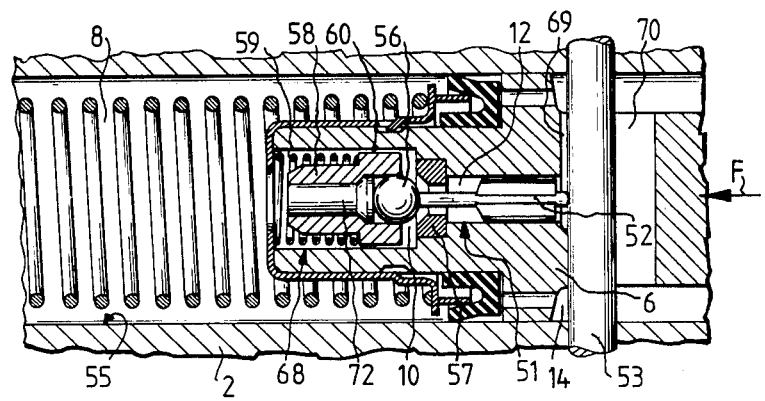
FIG. 2 is an enlarged sectional view of the central control valve shown in FIG. 1.

The control valves 10 and 11 are of similar construction and, thus only valve 10 is disclosed in detail. As shown in FIG. 2, the central control valve 10 comprises a plunger 52 displaceably disposed in a longitudinal port 51 of piston 6. The pedal-sided end of the plunger 52 strikes a stationary bolt 53 extending cross-wise through the piston port 55 of the master cylinder 2 and lifts off the valve ball 56 in the releasing position from the valve seat 57 thereof. The valve ball 56, for that purpose, is held in a cage 58 enclosing a rubber cushion or stopper 72 made of resilient material and is displaceable against the force of the closure spring 59. The pressure fluid, in the valve position as shown, can flow back from the pressure chamber 8 through an annular gap 60 between and past the valve ball 56 and valve seat 57 through the longitudinal bore 51 and the transverse groove 61 into the annular chamber 14 and then, through channel 16, back into the pressure fluid tank 20. Once piston 6 is displaced by the pedal force F in the direction of the arrow from the position as shown, the valve ball 56 places itself onto the valve seat 57 thereby sealing the longitudinal bore 51. Depending on the amount of the pedal force F, the central control valves 10, 11 can take a breather position with pistons 6, 7, at least in part, lifted off the transverse members and bolts 53, 54, respectively.

What is claimed is:

1. A skid-controlled brake system for use with automotive vehicles, said system comprising a pedal-operated, auxiliary-force-supported brake pressure generator including a master cylinder; main brake lines for connecting the pressure chambers of the master cylinder to the wheel brakes of the vehicle; electromagnetically operable pressure fluid inlet and outlet valves inserted into the main brake lines; hydraulic auxiliary pressure pumps; wheel sensors and electronic circuits for detecting the wheel rotation pattern and for generating electric brake pressure control signals for skid control; pistons in the master cylinder, the pistons being provided with central control valves which valves are open in the brake releasing position to provide communication through pressure fluid conduits between a pressure fluid tank and the pressure chambers, said central control valves being closed in the braking position to close said pressure fluid conduits, the main brake lines being connected to in-flow lines in which are located check valves, the hydraulic pumps being in communication with the in-flow lines and, the main brake lines and the pressure chambers, the suction connections of the hydraulic pump being in communication with the intake tank through an intake line, wherein the central control valve disposed in the piston of the master cylinder comprises a valve body longitudinally displaceable in a recess and cooperating with an opening plunger such that the plunger moves the valve body into its opening position when the piston is in its releasing position, the plunger being supported on a stationary transverse member.

2. A brake system according to claim 1 wherein the valve body of the central control valve is loaded by a spring toward a closing position with a valve seat, said valve seat being rigidly disposed on the piston of the master cylinder and being followed by the longitudinal port of the piston for the pressure fluid passage.

3. A brake system according to claim 2 wherein a pressure fluid passageway extends radially outwardly in the piston and terminates in the longitudinal port of the piston.

4. A brake system according to claim 1 wherein the transverse member is stationarily disposed in the wall of the master cylinder and extends through a recess in the piston.

* * * * *